United States Patent
Zarnowski et al.

(10) Patent No.: US 6,633,029 B2
(45) Date of Patent: Oct. 14, 2003

(54) VIDEO BUS FOR HIGH SPEED MULTI-RESOLUTION IMAGERS AND METHOD THEREOF

(75) Inventors: Jeffrey Zarnowski, McGraw, NY (US); Matthew Pace, Cortland, NY (US); Thomas Vogelsong, Jamesville, NY (US); Michael Joyner, North Syracuse, NY (US)

(73) Assignee: Silicon Video, Inc., Ithaca, NY (US)

(*) Notice: Subject to any disclaimer, the term of this patent is extended or adjusted under 35 U.S.C. 154(b) by 6 days.

(21) Appl. No.: 09/768,124

(22) Filed: Jan. 23, 2001

(65) Prior Publication Data

US 2001/0030702 A1 Oct. 18, 2001

Related U.S. Application Data

(63) Continuation-in-part of application No. 09/490,374, filed on Jan. 24, 2000, which is a continuation-in-part of application No. 09/039,835, filed on Mar. 16, 1998, now Pat. No. 6,084,229.

(51) Int. Cl.[7] .............................................. H01J 40/14
(52) U.S. Cl. ................................ 250/214 R; 250/208.1
(58) Field of Search .......................... 250/214 R, 208.1, 250/214 LA, 214 A; 257/291–293; 348/294–307

(56) References Cited

U.S. PATENT DOCUMENTS

| 4,590,609 A | 5/1986 | Chevalet et al. .............. 382/50 |
| 5,635,705 A | 6/1997 | Saunders .............. 250/214 RC |
| 5,712,932 A | * 1/1998 | Alexander et al. .......... 102/344 |

* cited by examiner

Primary Examiner—Que T. Le
(74) Attorney, Agent, or Firm—Bernhard P. Molldrem, Jr.

(57) ABSTRACT

A bus system and an imager for transferring signals from a plurality of signal streams to an output includes a plurality of signal buses in parallel and a control system. The control system multiplexes the signals from two or more of the plurality of signal streams onto two or more of the plurality of signal buses and allows the signals to substantially charge each of the two or more of the plurality of signal buses before demultiplexing the signals to the output. A method for transferring signals includes multiplexing signals on to two or more of a plurality of signal buses and allowing the signals to substantially charge each of the two or more of the plurality of signal buses before demultiplexing the signals to an output.

28 Claims, 12 Drawing Sheets

VIDEO BUS FOR HIGH SPEED MULTI-RESOLUTION IMAGERS AND METHOD THEREOF

This application is a continuation-in-part application of application Ser. No. 09/490,374 filed on Jan. 24, 2000 which is a continuation-in-part application of Ser. No. 09/039,835 filed Mar. 16, 1998, U.S. Pat. No. 6,084,229 issued on Jul. 4, 2000.

FIELD OF THE INVENTION

This invention relates generally to a bus and, more particularly, to a video bus for high speed multi-resolution imagers.

BACKGROUND OF THE INVENTION

A solid state imager is a semiconductor device capable of converting an optical image into an electronic signal. Imagers can be arranged in a matrix and utilized to generate video signals for video cameras, still photography, or anywhere incident radiation needs to be quantified. When incident radiation interacts with a photogate, charge carriers are liberated and can be collected for sensing. The number of carriers collected in a photogate represents the amount of incident light impinging on the site in a given time-period.

There are two basic devices with many variants, employed to collect and sense, charge carriers in a photogate. The two basic devices are photodiodes and photogates. Variants of photodiodes include, but are not limited to: Pinned, P-I-N, Metal-Semiconductor, Heterojunction, and Avalanche. Photogate structures include: Charge Couple Devices (CCD), Charge Injection Devices (CID) and their variants that include virtual phase, buried channel and other variations that utilize selective dopants. The selective dopants are used to control charge collection and transfer underneath and between the photogate(s) and the sense node.

The solid state imagers heretofore used have been dominated by CCD's because of their low noise as compared to Photodiodes and CIDs. The low noise advantage of CCD imagers is the result of collecting the photon generated charge at the pixel site and then coupling or shifting the actual charge to an amplifier at the periphery of the array. This eliminates the need for the long polysilicon and metal busses that degrade the signal with their associated resistance and capacitance. However, the low noise of the CCD requires the imager to be read in a fixed format and once the charge is read it is destroyed. The requirement of coupling the collected photon charge from the pixel to the periphery amplifier (a.k.a. CTE), requires proprietary processing steps not compatible with industry standards CMOS or BiCMOS processes.

Solid state imaging devices have developed in parallel with CMOS technology and as a result all imager manufacturers developed their own proprietary processes to maximize imager performance characteristics and wafer yield. Specialized silicon wafer processing kept imager prices relatively high. Linear active pixel sensors have been commercially produced since 1986. Beginning in the early 90's the move to transfer the proprietary processes to an industry standard CMOS processes was on. The advantages of using an industry standard process include: competitive wafer processing pricing, and the ability to provide on chip timing, control and processing electronics. By the end of the year 1992, a 612×512 CMOS compatible, CID imager with a preamplifier and CDS per column had been fabricated. The imager could either be operated as a random access 512×512 CID, or all the columns could be summed together and operated as a linear active pixel sensor.

Area arrays utilizing active pixel sensors in which a photodiode or photogate is coupled to an output source follower amplifier which in turn drives a Correlated Double Sampling (CDS) circuit, where the two outputs of the CDS cell then drives two more source followers circuits that in turn are fed into a differential amplifier are shown in U.S. Pat. No. 5,471,515 which is herein incorporated by reference. This uses source follower circuits, that typically have gains less than unity that vary from one source follower to another. The source follower gain variation is due to variations of FET thresholds. The source follower gain variation results in a pixel to pixel gain mismatch. Also, the active pixel sensors suffer gain variations due to the CDS circuit per column, when the CDS employs a source follower pair to drive its output. The resulting CDS signal and its corresponding offset can have different gains that are not correctable by the differential amplifier. Also, the source follower configuration of active pixel doesn't allow for binning of pixels.

The voltage mode of operation of prior art does not allow for binning, which, is the summation to two or more pixel signals at once.

What is needed is an imager which has the low noise level of a CCD, the random access, and binning of a CID, and uniform gain and response from all pixels; while, maintaining low power, ease of use and high analog video frame rates.

In addition to finding an imager which has the low noise level of a CCD, the random access, and binning of a CID, and uniform gain and response from all pixels, imagers suitable for industrial and/or scientific applications are also needed. Over the last 30 years the CCD sensor and camera electronics technology has evolved to meet most of the demands for industrial and/or scientific applications. However, the resulting cameras require a state-of-the-art, large pixel, multi-port CCD chip plus several extra chips and usually several circuit boards filled with electronics to accomplish this. Thus, the cameras cannot physically fit in certain applications, the power consumed is significant, and the resulting cameras are far too expensive for many applications. The necessary recombination of the video data from several ports, further increases the video processing complexity and ultimately drives-up the cost and size of the video system.

As discussed earlier over the past several years, thanks to design rule shrinkage, image sensors using sub-micron CMOS process technology have become practical. By using CMOS technology for the sensor array itself, the problem of integrating extra circuitry on chip becomes straightforward. Elements such as A/D converters, timing generators, control circuitry and interface circuitry can easily be added. In addition, the operation of CMOS imagers is simplified by the elimination of the need for precise timing and level control of multiple clocks required to drive the large capacitance transfer gates inherent in CCD'S. Even with all of these factors, including the exceptional speed and pico-second gate delays of sub-micron processes, the analog video bandwidth per port has not changed much over the past twenty years.

Active pixel sensors (APS) have been proposed as the means to achieve the flexible benefits of CMOS cameras on a chip. Unfortunately, there are performance issues with the fundamental APS approach that limit its performance and functionality. While these limitations may be acceptable for low-end consumer imaging applications, the demands of scientific, professional and industrial applications have, up until now, been largely unmet by CMOS image sensors.

More specifically, industrial and scientific imaging applications require much higher performance and functionality than that required for low-end consumer imaging products. Many of the applications require high readout speeds for video rate or even faster imaging without sacrificing image quality. In addition to image quality, the applications have come to demand greater functionality in the camera. Features such as flexible shuttering and electronic zoom, random access and selectable region of interest for maximizing frame rates and minimizing data storage (especially useful in tracking applications). Lowering the cost of machine system development is the recent advancement of single chip CMOS cameras. Newly developed CMOS cameras have all the flexibility previously listed, however the analog video bandwidth per port has not changed from the traditional CCD, CID or Photodiode technologies.

Most mega-pixel image sensors, including both CCD imagers and APS imagers, have a maximum pixel rate inadequate to meet the frame rate needs of industrial and scientific imaging. CCD devices are limited by both clocking rates and the speeds of the Correlated Double Sampled (CDS) circuitry. In addition the higher amplifier bandwidth required for higher pixel rates increases noise levels. With the column parallel nature of CMOS imagers, the amplifier and CDS can be run at the line rate rather than the pixel rate. The video bandwidth constraints come in terms of the multiplexing speed. CMOS imagers typically multiplex their signals onto a common analog video bus. The more signals that are multiplexed or switched onto the bus, the greater the capacitive load of that bus. Therefore, as more signals are connected to the bus, the bandwidth of the bus is reduced. Alternatively, greater power is needed to charge and discharge the bus with its associated capacitance to maintain bandwidth. This traditional bus structure described above involves N signals that are switched onto one bus.

One example of a CMOS imager 98 with column parallel amplifiers 100 that drive a common video bus 102 is illustrated in FIG. 5. In this example, the common video bus 102 is seen mostly as a capacitive load 140 to each individual column amplifier 100. In order for each amplifier 100 to truly represent the pixel value onto the common video bus 102, each amplifier 100 must charge or discharge the bus 102 with in one pixel time constant. The pixel value signal must be stable long enough for a sample and hold circuit (or similar) to accurately present the resultant signal to an A to D converter (not shown). Typically, at least 5τ (tau or time constants) is desired to accurately allow the video bus 102 to settle the video value presented by each individual column amplifier 100, although this can vary between applications. At higher video bus speeds each amplifier 100 is unable to properly charge or discharge the video bus 102 resulting in a loss of contrast ratio. At higher pixel element rates where the contrast ratio is compromised, the individual column amplifier characteristic and the video switch characteristics begin to affect the resultant video. Each individual column amplifiers 140 has a slightly different offsets with slightly different drive capabilities and each video switch 120 will have slightly different resistances and slightly different thresholds. This combination of column amplifier and video switch characteristics results in each column amplifier 100 having different time constants relative to charging and discharging the video bus 102. The column amplifier 100 and video switch 120 are common to every pixel in that column. Thus, variations in the video switch characteristics result in what appears to be column based Fixed Pattern Noise (FPN). As more columns are added, each video switch 120 adds more associated capacitance 140 due to the source and drain junctions of MOSFET or Bipolar transistors. The more columns added to the bus 102, the higher the total capacitance.

In order to overcome these constraints, one prior solution by designers of CCD's and APS sensors has been to divide up the imager into halves, quarters, or smaller groupings of sub-imagers jammed together. One example of this prior design solution is shown in FIG. 6. In this example, the imager 80 is divided up it to four sub-imagers 80(1)–80(4). The signal from each of these sub-imagers 80(1)–80(4) is brought out to its own port 82(1)–82(4). This structure or architecture also involves getting many signal streams of N signals on to one bus. This design has been used to provide high frame rate devices and to meet standard frame rates with large mega-pixel imagers. Unfortunately, this design adds system size, complexity, power and cost to handle the multiple analog amplifier chains. Additionally, it is an extremely challenging task to balance the amplifier chains completely over all possible pixel rates and temperatures. This issue has become even more of a problem in recent years as imagers have grown larger, now up to full wafer size. The process variations across an array can lead to further balance problems, and even variations in noise characteristics due to process variations across a wafer.

SUMMARY OF THE INVENTION

A bus system for transferring signals from a plurality of signal streams to an output in accordance with one embodiment of the present invention includes a plurality of signal buses in parallel and a control system. The control system multiplexes the signals from two or more of the plurality of signal streams onto two or more of the plurality of signal buses and allows the signals to substantially charge each of the two or more of the plurality of signal buses before selecting the signals to the output multiplexor.

An imager in accordance with another embodiment of the present invention includes a plurality of streams of signals, a plurality of signal buses in parallel, an output, and a control system. The control system multiplexes the signals from two or more of the plurality of signal streams onto two or more of the plurality of signal buses (i.e. an input multiplexor) and allows the signals to substantially charge each of the two or more of the plurality of signal buses before demultiplexing the signals to the output multiplexor.

A bus system for transferring signals from a plurality of signal streams to an output in accordance with another embodiment of the present invention includes a plurality of signal buses coupled to the plurality signal streams, a plurality of first switches, a plurality of second switches, and a control system. Each of the plurality of first switches is coupled between one of the plurality of signal streams and one of the plurality of signal buses. Each of the plurality of second switches coupled between one of the plurality of signal buses and the output. The control system is coupled to the first and second switches and closes two or more of the plurality of first switches to couple signals from the two or more of the plurality of signal streams to two or more of the plurality of signal buses and allows the signals to substantially charge each of the two or more of the plurality of signal buses before closing one or more of the plurality of second switches of the output multiplexor to couple the signals to the output. In other words, this system described above involves N signals multiplexed to two or more busses (or M busses) and then multiplexed on to one bus or in other words a two stage multiplexor with an input multiplexor and an output multiplexor. A two stage multiplexing system allows for a variety of different operations, such as allowing signal or pixel signal skipping and allowing multiple signals or pixels signals to be selected at once. By way of example, pixel signals could be alternately individually selected and then two adjacent signals could be selected to allow signal averaging or interpolation, effectively changing the native resolution of pixel for either higher or lower resolution. This present invention coupled with Active Column Technology as described in U.S. Pat. No. 6,084,229, which is herein incorporated by reference, allows for binning or skiping of pixels along the rows as well as the columns.

A method for transferring signals in accordance with yet another embodiment of the present invention includes multiplexing signals on to two or more of a plurality of signal buses and allowing the signals to substantially charge each of the two or more of the plurality of signal buses also known as input multiplexing before demultiplexing select signals by the output multiplexor. Also, included in this particular embodiment is a reordering multiplexor that redirects signals from the output multiplexor to one or more outputs.

DETAILED DESCRIPTION

Figure 1:
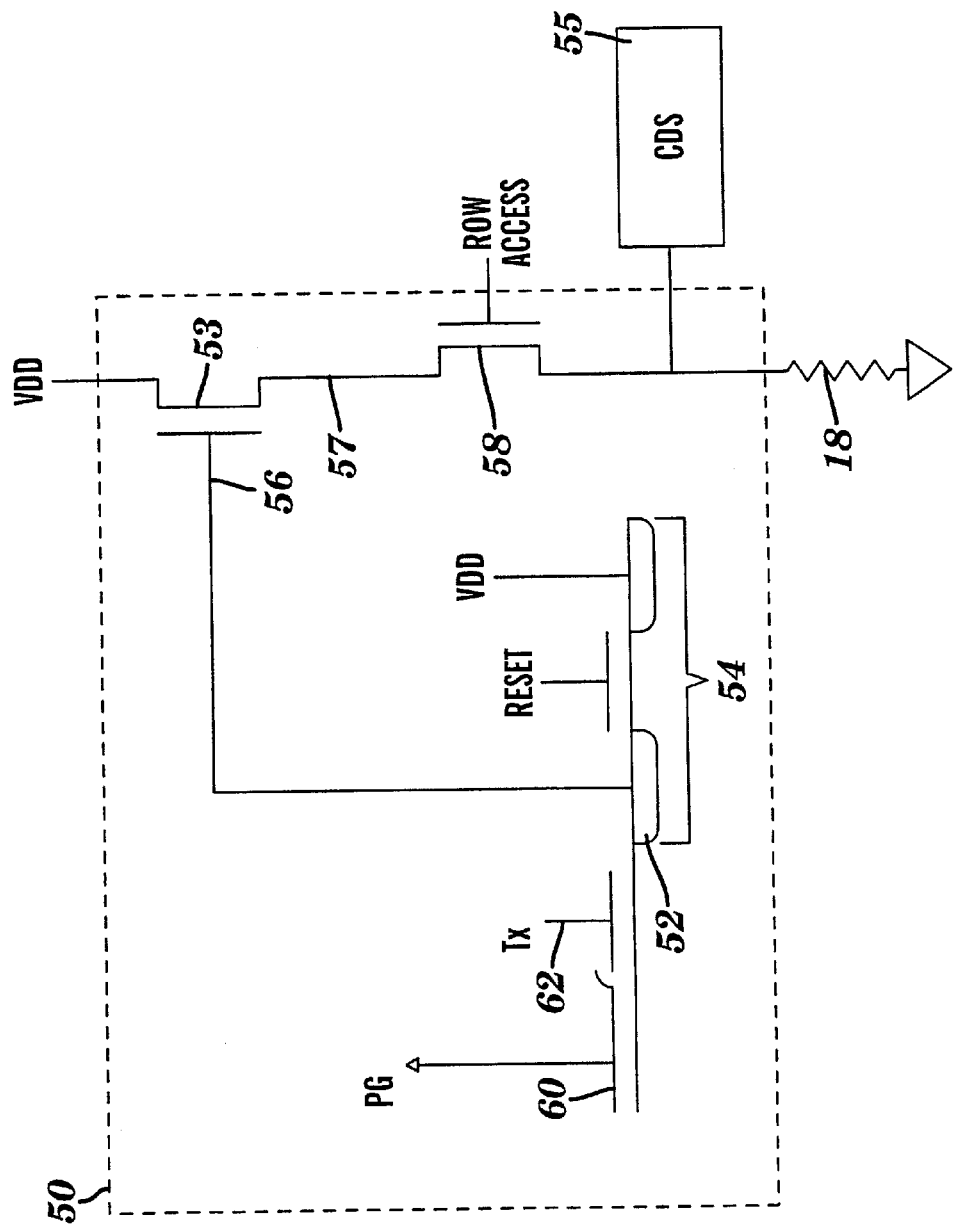
FIG. 1 is a prior art double polysilicon active pixel sensor.

Before discussing the Active Column Sensor (ACS) circuit of FIG. 2 of the present invention and described in conjunction with a discussion of ACS below, it will be useful to discuss the structure of a typical double-polysilicon active pixel sensor of prior art as shown in FIG. 1.

In FIG. 1 each pixel 50 has a photogate 60 that has an output FET 53 configured as a source follower. The source follower 53 is used to drive a subsequent signal conditioning circuitry, such as a Correlated Double Sampled Circuit (CDS) 55. The gain through a source follower 53 is less than unity. If the source follower located at the pixel site 50 has a given gain other pixels and their respective source followers in the same column may or may not have the same gain. The technique relies on wafer processing for all FETs in the array to have the same threshold. It isn't uncommon for FET thresholds, during operation, to vary by 100 mV for a linear active pixel array.

The active pixel 50 of the prior art includes a photogate 60 and a transfer gate 62 that are used to couple photo generated charge onto the floating diffusion node 52 which is connected to the gate 56 of source follower 53. The drain of the output FET 53 is connected directly to a power supply rail VDD. The source follower output FET is in turn connected to the source 57 of row access FET 58. When the row access FET 58 is selected for reading, the FET 58 is turned on, allowing output FET 53 to be connected to a load 18 and drive the CDS circuitry 55 directly.

Figure 2:
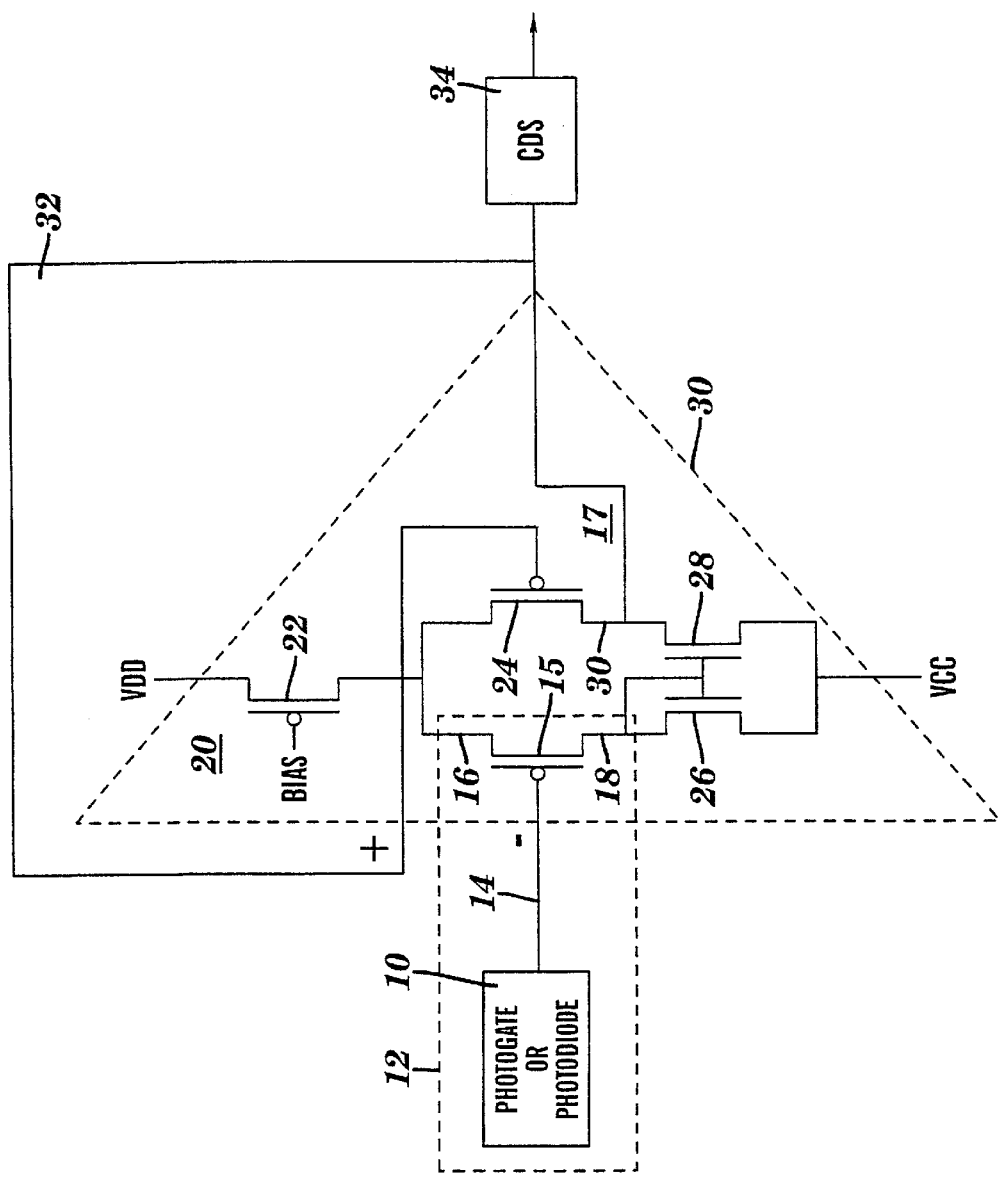
FIG. 2 is an active column sensor in accordance with this invention.

FIG. 2 is a schematic diagram of a pixel 12 in accordance with the present invention in which the threshold variations from pixel to pixel of the prior art are eliminated. All pixels 12 in a row or column are in parallel and for simplicity only one is shown. Pixel 12 which can consist of any photosensitive device 10 is coupled to a FET 15 to isolate the pixel from the readout circuitry. The FET 15 is one FET of a differential input pair of an operational amplifier 30 that includes FET 24. For simplicity, in FIG. 2 the amplifier circuit 30 is configured as a positive feedback unity gain amplifier. A feedback path 32 connects the output of amplifier 30 to input 17 which in this case is the gate of FET 24. The amplifier 30 could be configured to have gain, a full differential input or any operational amplifier configuration as the application required. The fixed gain of amplifier 30 eliminates the gain variability of the prior art. The output of the unity gain amplifier is connected to a Correlated Double Sampler (CDS) which is utilized to eliminate any fixed pattern noise in the video.

A current source 20 comprising an FET 22 has its source connected to a power source VDD and its drain connected to the sources of differential input FETs 15 and 24.

The drains of input FETs 15 and 24 are connected to a current mirror formed from FETs 26 and 28. The gates of FETs 26 and 28 are connected together and to the source 18 of input FET 15. The sources of FETs 26 and 28 are connected to a negative power source, VCC.

The drain 30 of FET 24 is the output of the differential pair and is connected to CDS 34.

The input FET 15 could be either a N channel or P channel FET as the application requires. The pixel 80 could be either a photogate or photodiode.

Figure 3:
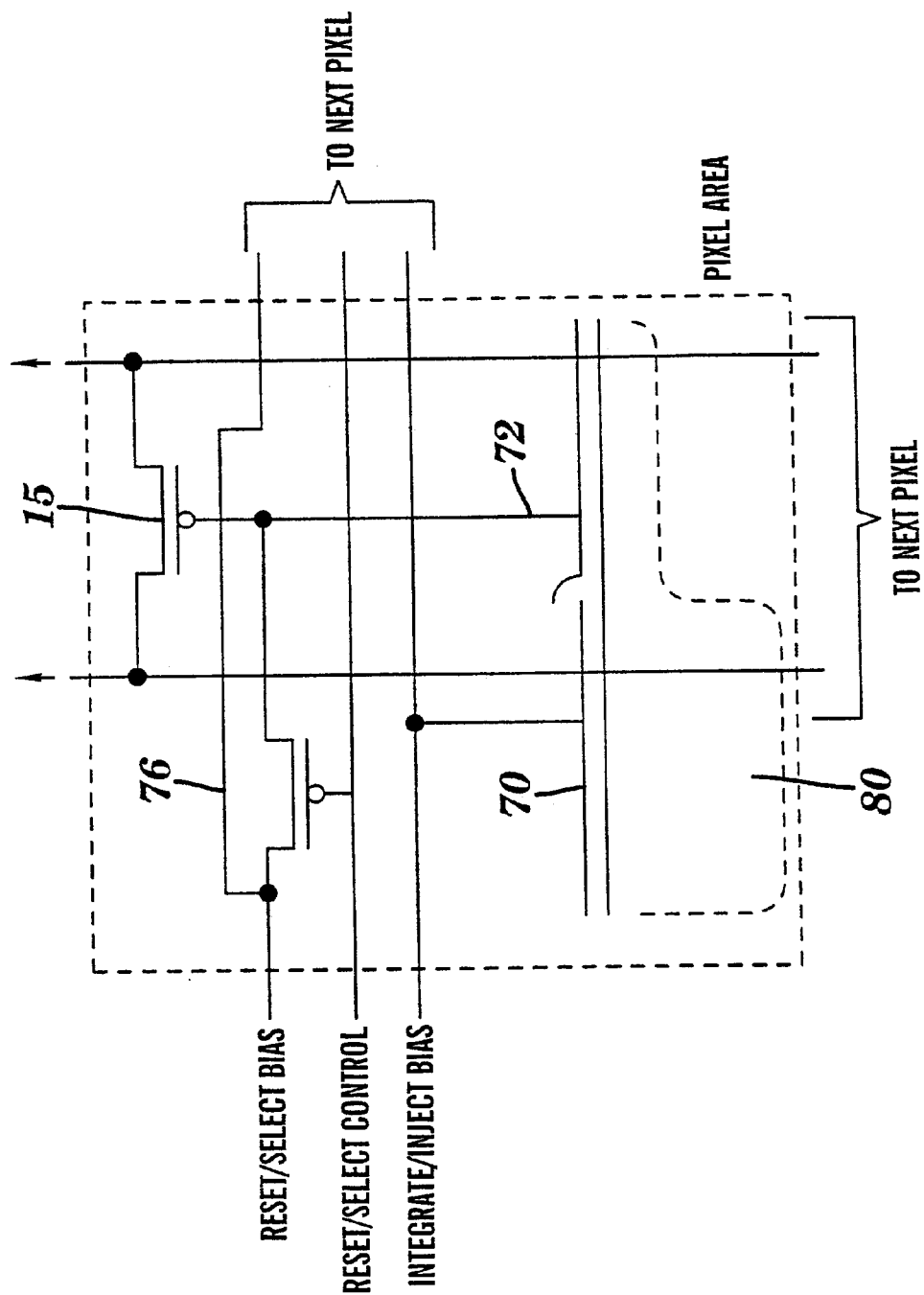
FIG. 3 is an implementation of a pixel in accordance with the invention.

FIG. 3 is a detailed schematic of pixel 12 of the active column sensor shown in FIG. 2. In this implementation a photogate 76 is utilized. Selection and reset of a sense node 72 is controlled by an FET 76. This Active Column Sensor pixel eliminates the separate selection/access FET 58 of prior art. All biasing and controls signals are supplied from the periphery of the pixel array.

The pixel can be operated in the following manner. An N type substrate is used and the substrate is biased the most positive potential, e.g. 5.0 volts. The photogate 70 preferably a layer of polysilicon is biased to an integrate level (e.g. 0.0 volts). The region 80 under the photogate 70 is depleted and as light strikes the immediate area, it will collect (integrate) photon generated carriers. Photogate 72 is biased to the 5.0 volts and will not collect photon generated carriers during the integration because it is biased to the same potential as the substrate. Photogate 72 is biased by selecting control FET 76 with the reset/Select Control signal. In this configuration control FET 76 is a P channel FET that is selected by a negative signal relative to the substrate, for example 0.0 volts. During integration FET 76 is selected, the photogate is biased by the reset/select bias that preferably is at 5.0 volts. After a predetermined integration time period the pixel is read.

Reading the pixel is preferably accomplished in the following manner. The reset/select control is changed to 2.5 volts, causing the region beneath photogate 72 to be depleted, and the background level is read. Reset/select FET 76 is turned off by setting the reset/select control to 5.0 volts. Photogate 70 has its potential removed, and in this example 5.00 volts. Reading the signal will occur as the collected photon generated charge transfers from the region beneath photogate 70 to the region beneath photogate 72. The transferred photon generated charge modulates the gate of input FET 15, according to the amount of collected.

Fixed Pattern Noise (FPN) can be eliminated from the video information by utilizing CDS circuit 34. The first sample applied to the CDS circuit is the background level. The signal information is then applied to the CDS. The difference of the two signals provides for a fixed pattern noise free signal.

Figure 4:
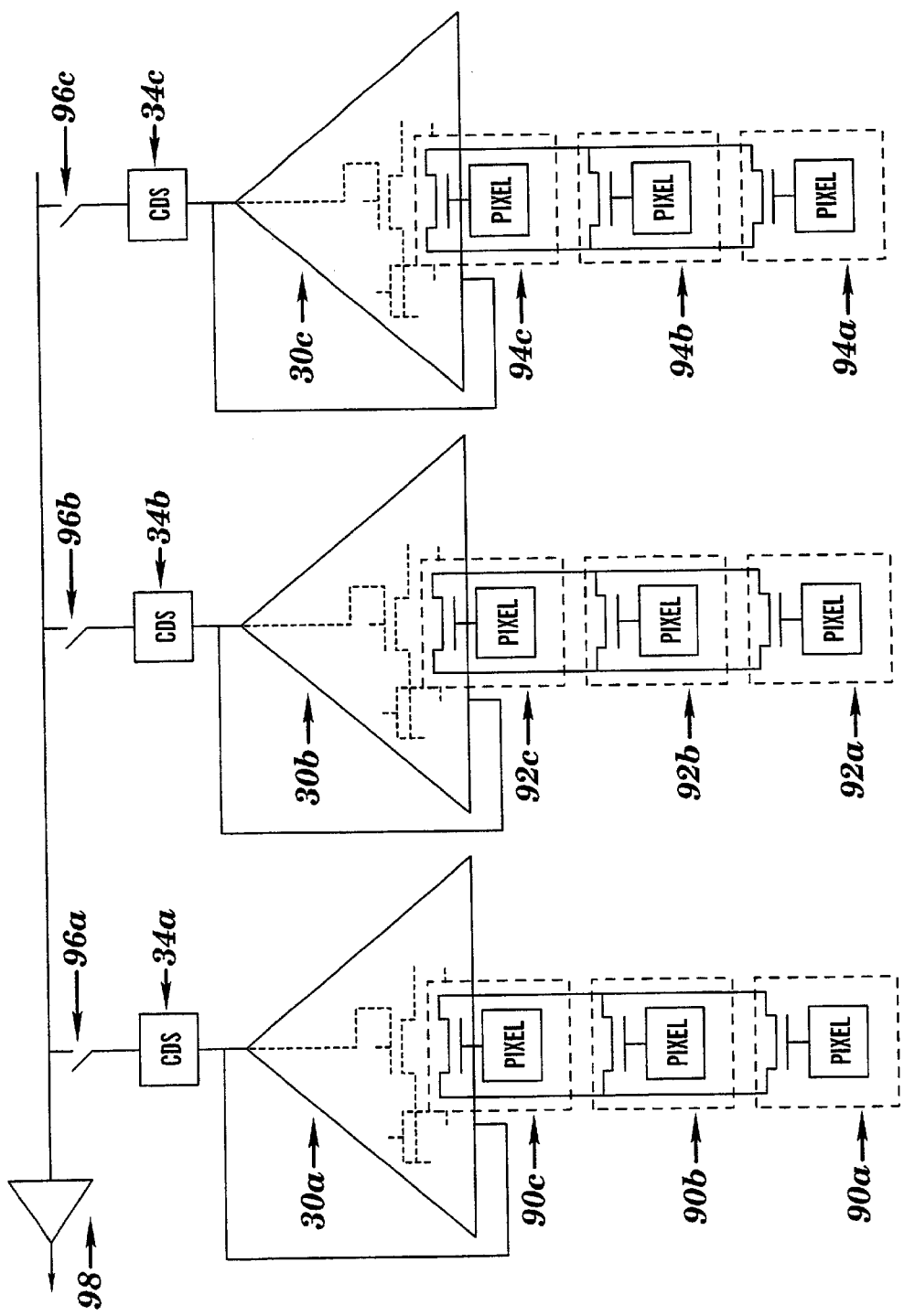
FIG. 4 is a schematic illustration of a matrix of pixels connected to incorporate a full operational amplifier per pixel forming an Active Column Sensor.
Figure 5:
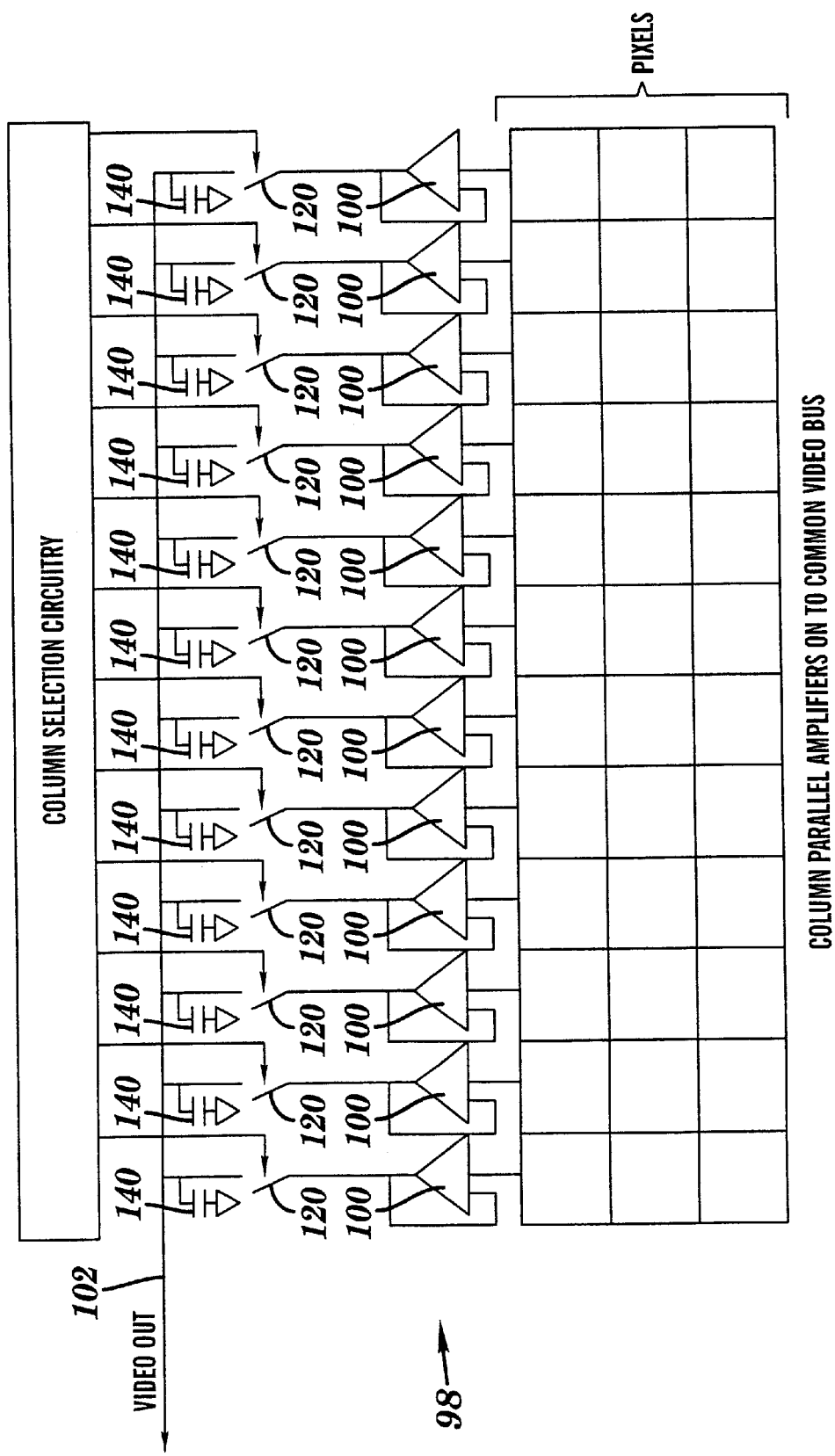
FIG. 5 is a view of a conventional method of driving a common video bus on an imager.

FIG. 4 is a schematic diagram of an array of pixels in accordance with this invention. A plurality of pixels 90a, 90b, 90c form a first column of the array, and similar columns 92a–c and 94a–c complete the array. Within each column, the pixels are connected with their output FETs in parallel, the combination forming the first one of the differential input pair of operational amplifier 30. In all other respects, amplifiers 30a, 30b and 30c are identical to FIG. 2. Each amplifier 30 is connected to a CDS 34a, 34b, and 34c respectively. The outputs of CDS 34a, b, c are connected through column select switches 96a, 96b, and 96c, the common terminals of which are connected to output buffer 98 which can be a source follower, or a more complex signal conditioner as required by the specific application.

As discussed earlier, industrial and scientific imaging applications require much higher performance and functionality than that typically required for consumer imaging products. More specifically, many of these applications require high readout speeds for video rate or even faster imaging without any sacrifice in image quality. One of the advantages of the present invention is that it provides an on-board, high-speed bus system 200 or PVS bus that allows pixel rates exceeding those of prior single port CCD or APS devices and other prior analog buses. This bus system 200 in combination with the highly parallel nature of amplifier per column techniques of CMOS sensors provides the functionality and the high speed performance required for scientific and industrial applications. This speed increase has been achieved without increasing power consumption while maintaining full video bandwidth even at the higher speeds. Additionally, the present invention is able to eliminate common mode noise pickup through the use of fully differential processing. Further, the high speed, low noise, low power, analog PVS bus utilizes either standard sequential or random access decoders for selection of a particular column. In addition to selecting a column, the bus system 200 has the added preselection circuitry to pre-select the next multiple columns in the read sequence in parallel. The number of columns pre-selected can be scaled to meet the application requirements.

Figure 7A:
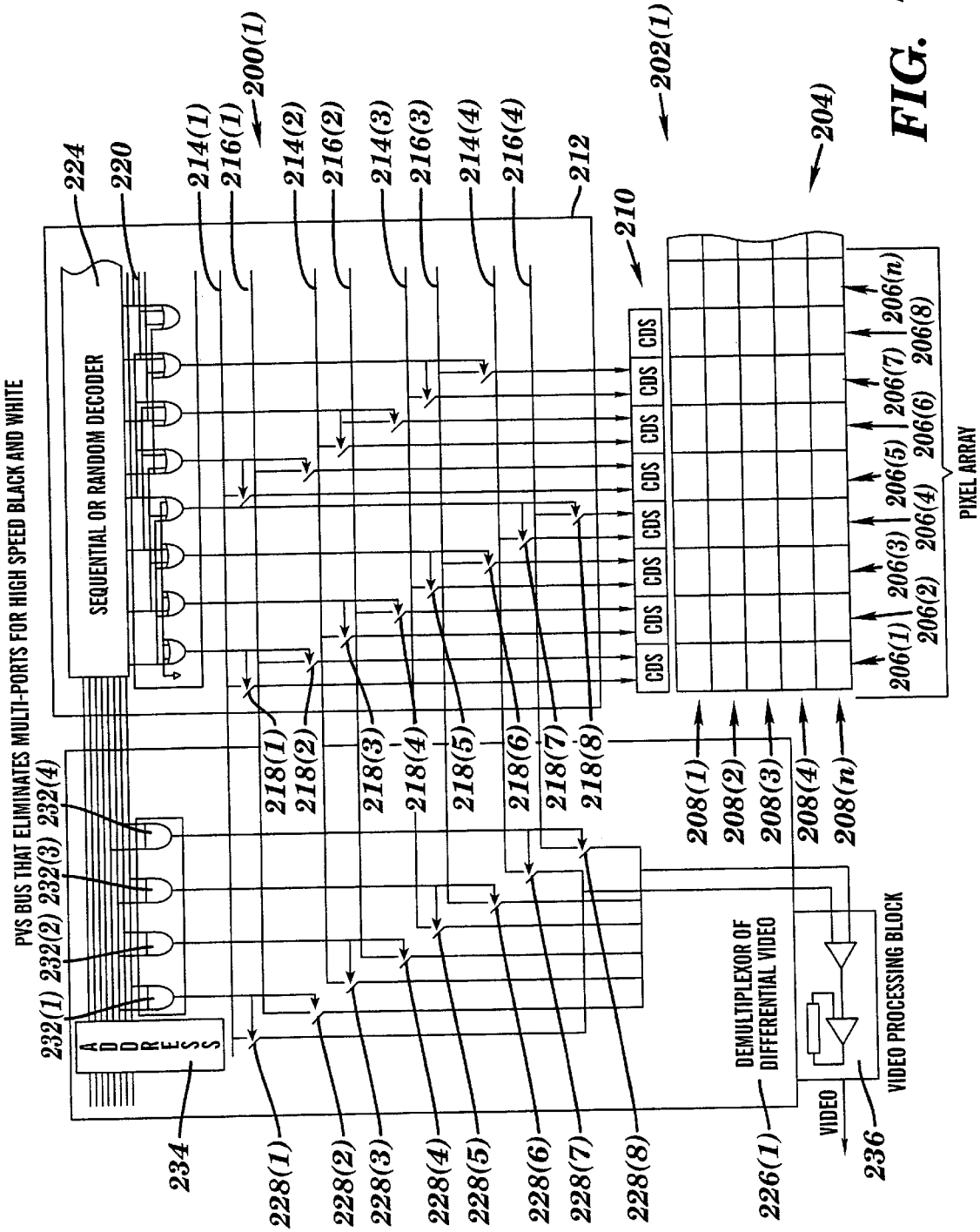
FIG. 7A is a diagram of an imager with a high speed, low noise bus system in accordance with one embodiment of the present invention.

Referring more specifically to FIG. 7A, a diagram of an imager 202(1) with a high speed, low noise bus system 200(1) in accordance with one embodiment of the present invention is illustrated, although the bus system 200 could be used with a variety of different types of devices, such as video cross point switch, and for a variety of different types of applications. In this particular embodiment, the imager 202(1) includes a pixel array 204 with a plurality of columns 206(1)–206(n) and rows 208(1)–208(n) of pixels along with image processing circuitry, such as that described earlier with reference to FIGS. 2–4. An optional correlated double sampling ("CDS") circuit 210 is coupled to the end of each of the columns 206(1)–206(n) in this example. Although in this particular example the bus system 200(1) is coupled to the end of the columns 206(1)–206(n) for the array 204, the bus system 200(1) could also be coupled in to other locations, such as to the end of the rows 208(1)–208(n) of the array 204.

A multiplexor 212 is coupled to one of the ends of the columns 206(1)–206(n) for the array 204, although the multiplexor 212 could be coupled to other locations and to other sources of data. In this particular embodiment, the multiplexor 212 comprises a plurality of multiplexing buses 214(1)–214(4) and 216(1)–216(4), a plurality of switches 218(1)–218(8), and a preselection or control circuit 220, although the multiplexor 212 could be made of other components. The multiplexor 212 selects multiple columns 206(1)–206(n) or rows 208(1)–208(n) of the array 204 and then multiplexes signals from those columns 206(1)–206(n) or rows 208(1)–208(n) on to the multiplexing buses 214(1)–214(4) and 216(1)–216(4) at the same time.

More specifically, in this particular embodiment each column 206(1)–206(n) of the array 204 through the CDS circuit 210 is coupled to one of the plurality of multiplexing buses 214(1)–214(4) and 216(1)–216(4). There are four pairs of multiplexing buses: 214(1), 216(1); 214(2), 216(2); 214(3), 216(3); and 214(4), 216(4), with one pair of multiplexing video buses coupled to each column of the array 206(1)–206(4), although the total number and types of buses as well as the number of buses coupled to each column or row of the array 204 can vary as needed or desired. In this particular embodiment, a pair of multiplexing buses are coupled to each column of the array to permit differential processing.

The switches 218(1)–218(8) are each coupled between one of the columns 206(1)–206(4) of the array 204 and one of the multiplexing buses 214(1)–214(4) and 216(1)–216(4). Each of the switches 218(1)–218(8) has an open position and a closed position. In an open position, the switches 218(1)–218(8) disconnect the columns 206(1)–206(4) of the array 204 from the multiplexing bus 214(1)–214(4) and 216(1)–216(4) and in a closed position the switches 218(1)–218(8) couple the columns 206(1)–206(4) of the array 204 to the multiplexing buses 214(1)–214(4) and 216(1)–216(4).

The preselection circuit 220 (also shown in FIG. 7B) is coupled to each of the switches 218(1)–218(8) and controls whether each of the switches 218(1)–218(8) is in an open or a closed position. Since control circuits to control the opening and closing of switches are well known to those of ordinary skill in the art, the preselection circuit 220 will not be described in detail here. In this particular embodiment, the preselection circuit 220 comprises a plurality of "OR" Boolean logic function gates ("OR gate") 222(1)–222(n) that each have four inputs and one output, although other types of components with other numbers of inputs and outputs and other types of logic functions could be used for the preselection circuit 220.

A decoder 224 (also shown in FIG. 7B) with a plurality of inputs and a plurality of outputs is coupled to the preselection circuit 220. A variety of different types of decoders 224 could be used, such as a sequential decoder or a random decoder. The decoder 224 transmits input signals to each of the OR gates 222(1)–222(n). The output of each OR gate 222(1)–222(n) is coupled to one of the switches 218(1)–218(n) and depending upon the signals received via the inputs to the OR gates 222(1)–222(n), the signal from the output of the OR gate 222(1)–222(n) coupled to each switch 218(1)–218(n) will either open or close that switch 218(1)–218(n). In this particular embodiment, the decoder 224 and preselection circuit are designed to couple multiple columns of the pixel array to the different multiplexing buses 214(1)–214(4) and 216(1)–216(4) at one time.

An output multiplexor 226 is coupled to each of the multiplexing buses 214(1)–214(4) and 216(1)–216(4) and is designed to match the configuration of the multiplexor 212. In this particular embodiment, the output multiplexor 226(1) comprises the plurality of multiplexing buses 214(1)–214(4) and 216(1)–216(4), a plurality of switches 228(1)–228(8), and a control circuit 230(1), although the output multiplexor 226 could be constructed of other components. The switches 228(1)–228(n) remain closed at least until the signal(s) from the columns 206(1)–206(n) have changed the bus(es) 214(1)–214(4) and 216(1)–216(4) in this particular example. The timing for the output multiplexor 226 is generated via external control (not shown), such an on chip counter, a small shift register, or a controller.

In this particular embodiment, the control circuit 230(1) (also shown in FIG. 7C) comprises a plurality of AND gates 232(1)–232(4) which each have a pair of inputs and an output, although other types of components with other numbers of inputs and outputs and other types of logic functions could be used for the control circuit 230. An address counter 234 transmits input signals to each of the AND gates 232(1)–232(4). The output of each AND gate 232(1)–232(4) is coupled to one of the switches 228(1)–228(8) and depending upon the signals received via the inputs to the AND gates 232(1)–232(4), the signal from the output of the AND gates 232(1)–232(4) will either open or close the switches 228(1)–228(8) coupled to the AND gates 232(1)–232(4). In this example, the control circuit 230(1) is used to select the signal from one column 206(1), 206(2), 206(3), or 206(4) of the pixel array 204 at a time, although the control circuit 230(1) can be configured with other components and controlled with other input signals to select one or more signals from one or more other columns 206(1)–206(4) of the pixel array 204 at a time.

In this particular embodiment, a video processing circuit 236 is coupled to the output of the output multiplexor 226, although other types of processing circuits can also be used. The video processing circuit 236 takes the differential video from the two buses: 214(1), 216(1); 214(2), 216(2); 214(3), 216(3); and 214(4), 216(4), coupled to the video processing circuit 236 and provides gain, offset, filtering, and/or any other desired processing function in manners well known to those of ordinary skill in the art.

Figure 8A:
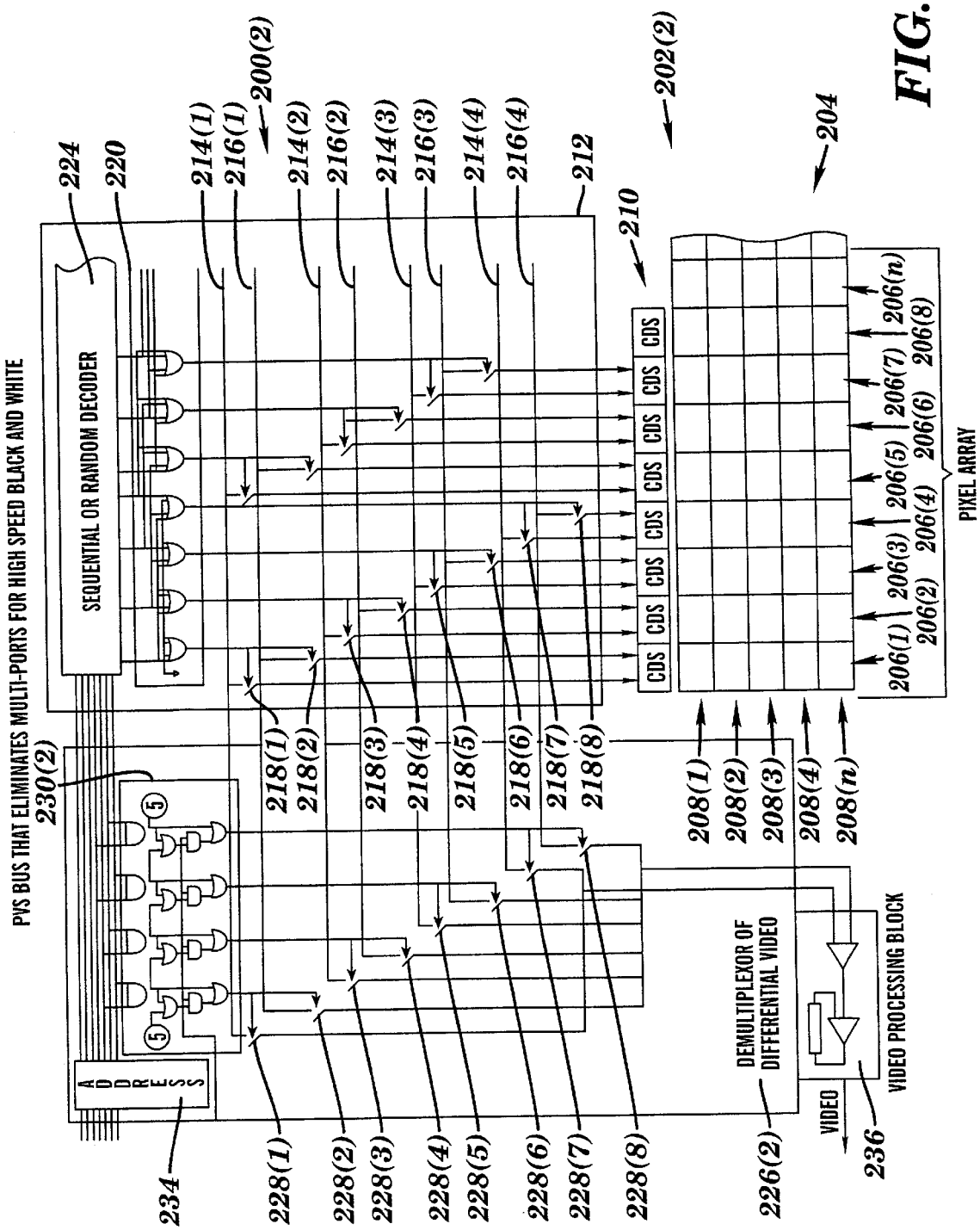
FIG. 8A is a diagram of an imager with a bus system for pixel interpolation for increased resolution in accordance with another embodiment of the present invention.
Figure 8B:
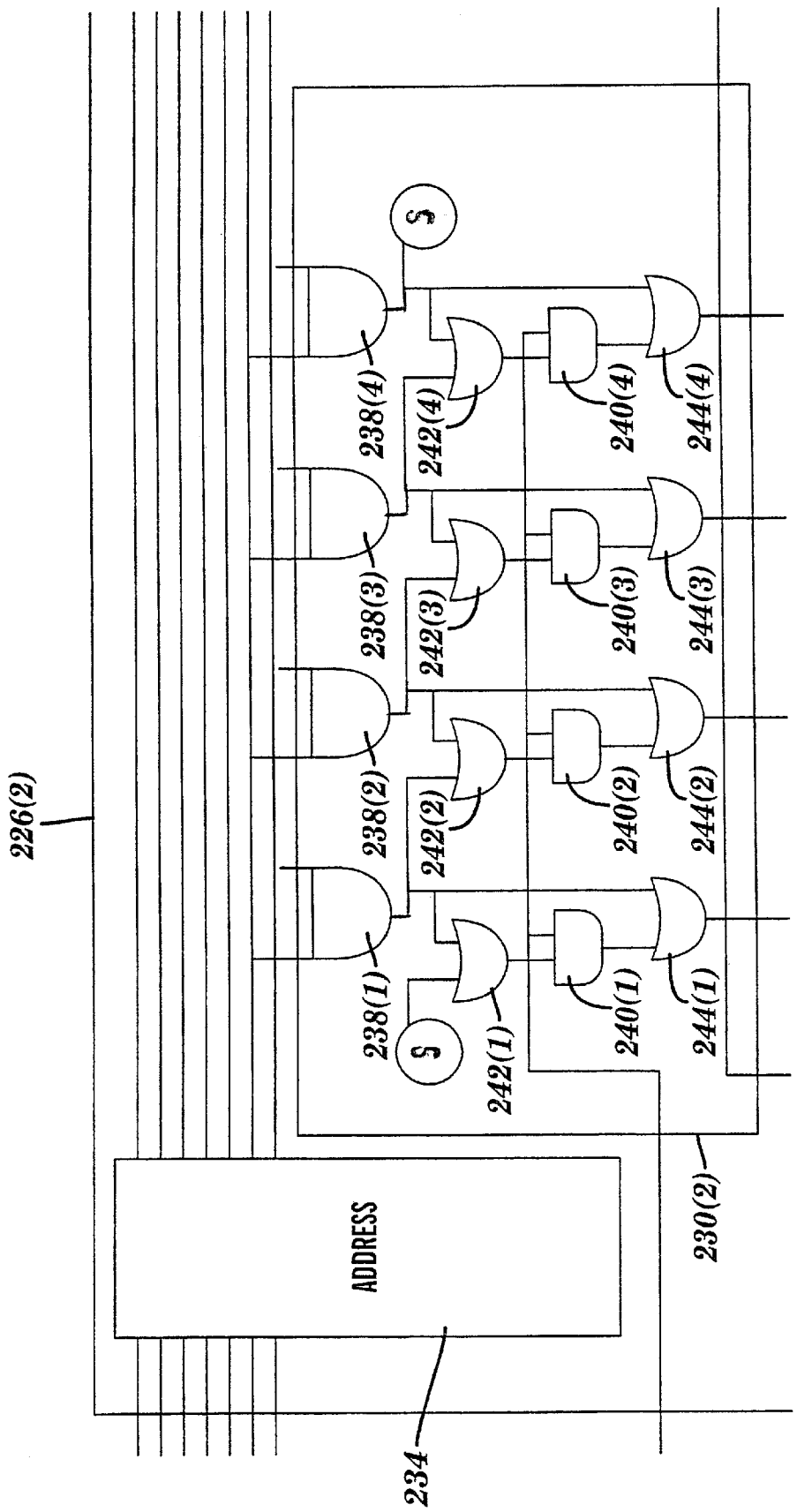
FIG. 8B is an enlarged view of an address counter and a control circuit in the imager shown in FIG. 8A.

Referring to FIG. 8A, an imager 202(2) with a high speed, low noise bus system 200(2) in accordance with another embodiment of the present invention is illustrated. FIGS. 8A and 8B illustrate how this particular embodiment can be utilized to change the native resolution of an imager. Since the imager 202(2) and bus system 200(2) in FIG. 8A is the same as the imager 202(1) and bus system 200(1) in FIG. 7A except for the control circuit 230(2), only the control circuit 230(2) of FIGS. 8A and 8B will be described here. In FIGS. 8A and 8B the control circuit 230(2) comprises an address counter 234 with a plurality of inputs and a plurality of outputs along with a plurality of AND gates 238(1)–238(4) and 240(1)–240(4) and OR gates 242(1)–242(4) and 244(1)–244(4) which each have a pair of inputs and an outputNode 5 is connected to itself. Since control circuits to control the opening and closing of switches are well known to those of ordinary skill in the art, the control circuit 230(2) will not be described in detail here. In this particular embodiment, the control circuit 230(2) with the address counter 234, and interpolation control signal 243, is configured to interpolate the signals from the columns 206(1)–206(n) of the pixel array 204 as explained in greater detail later. In this example, the address counter 234 transmits input signals to the control circuit 230(2). The control circuit 230(2) is coupled to the switches 228(1)–228(8) and depending upon the signals received at the inputs to the control circuit 230(2), the signals from the control circuit 230(2) will either open or close the switches 228(1)–228(8) to provide column interpolation in this example.

Figure 6:
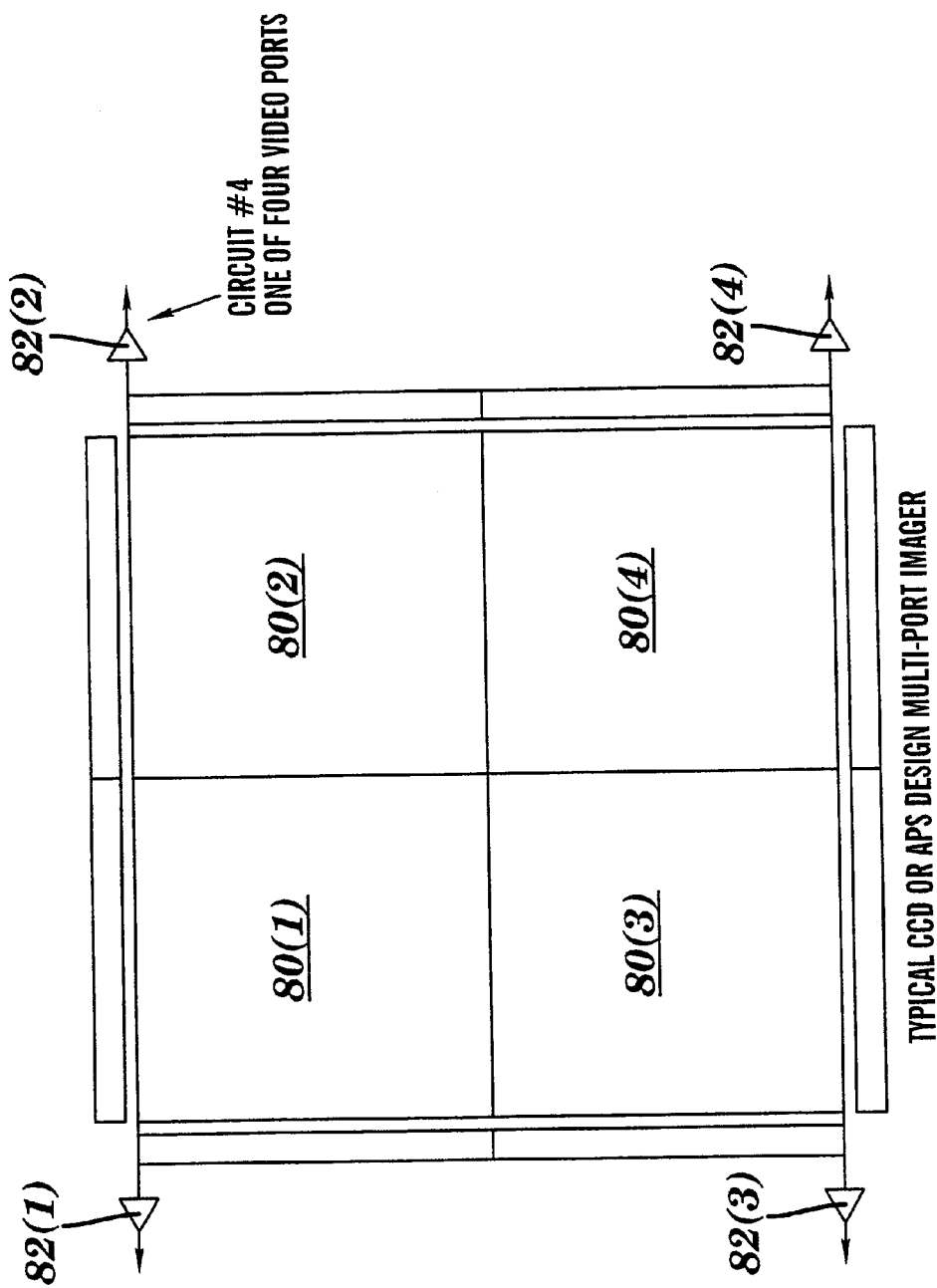
FIG. 6 is a view of a traditional CCD and CMOS sensor method of increasing video bandwidth with multiple ports.
Figure 7B:
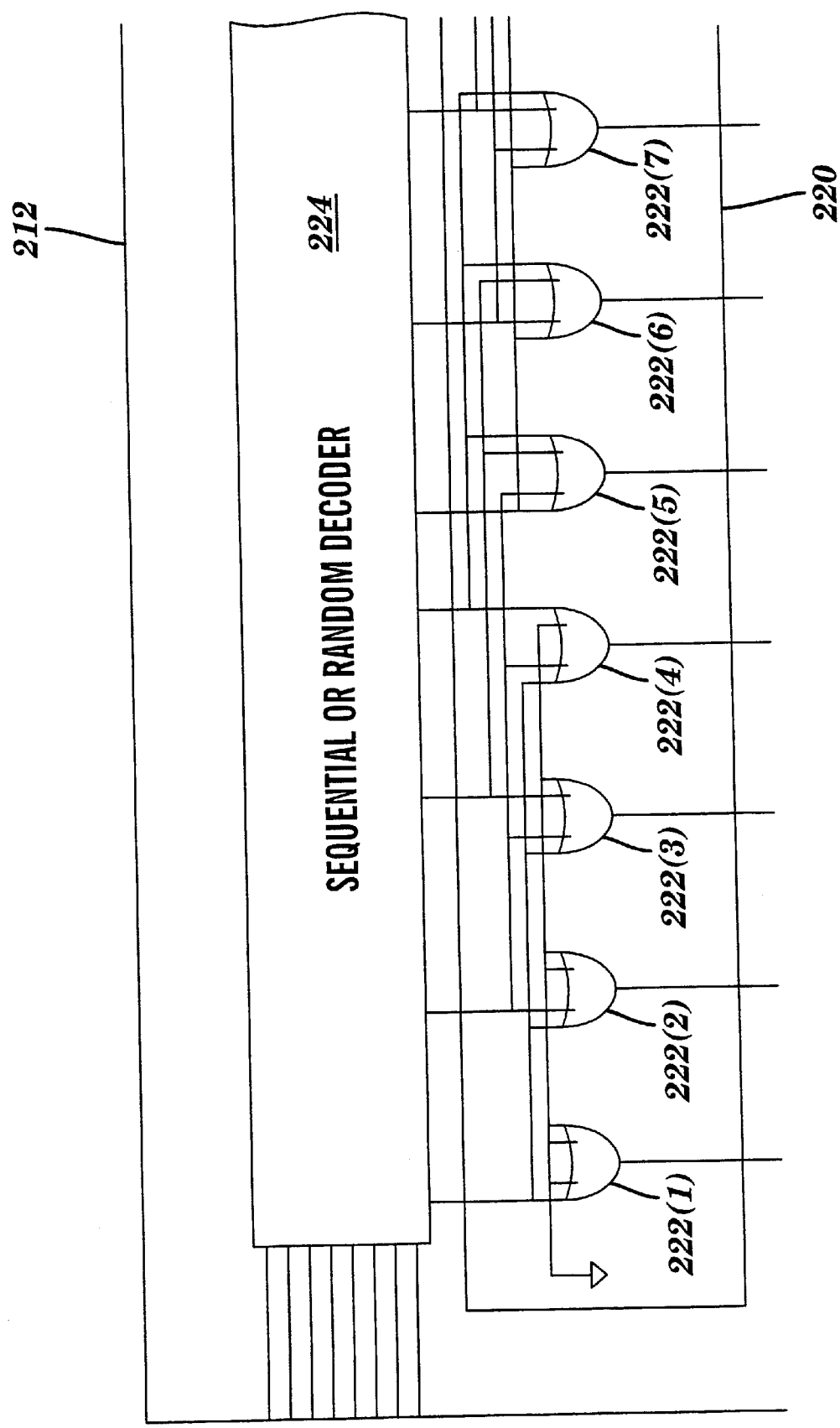
FIG. 7B is an enlarged view of a decoder and a preselection circuit in the imager shown in FIG. 7A.
Figure 7C:
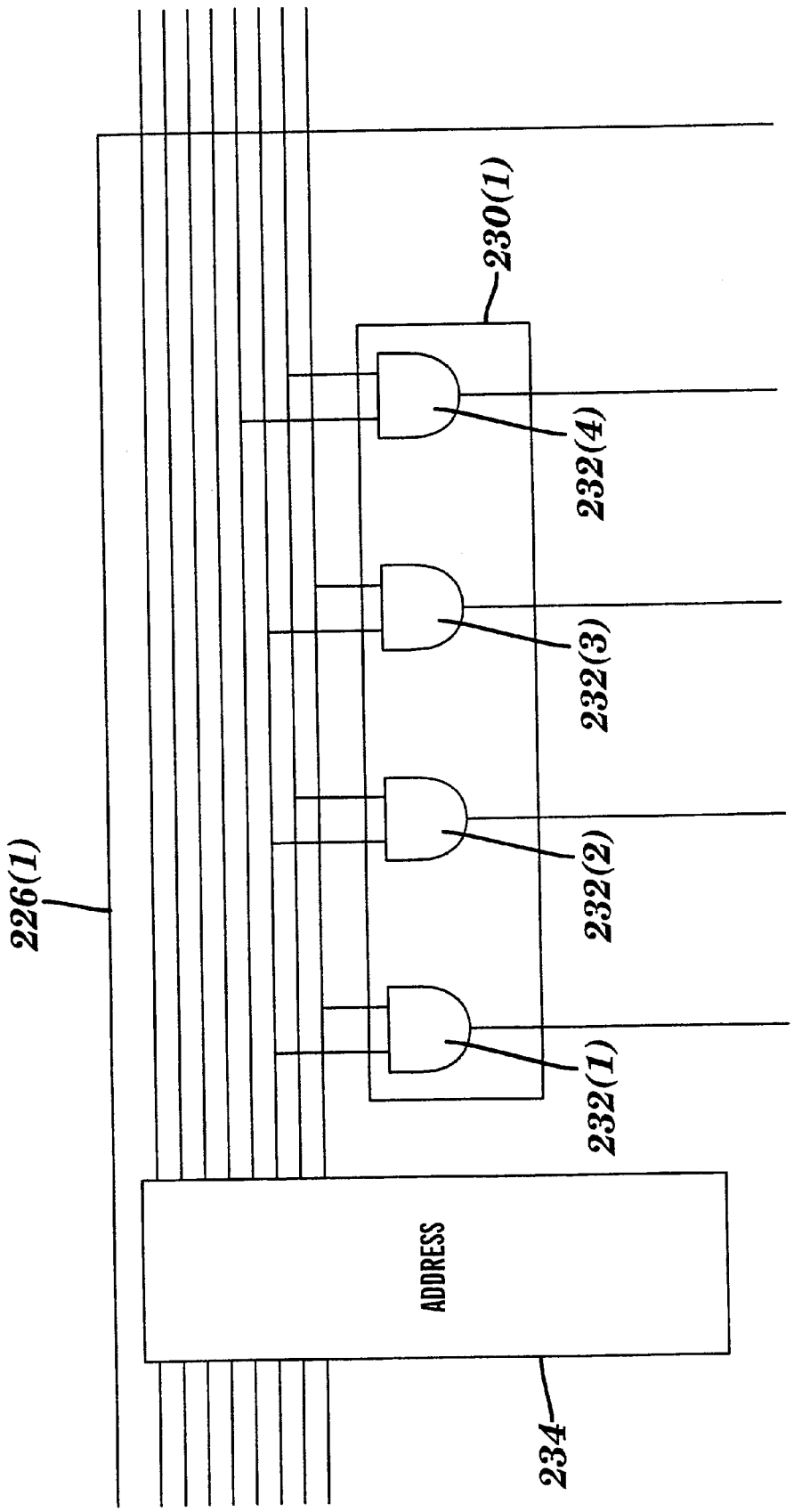
FIG. 7C is an enlarged view of an address counter and control circuit in the image shown in FIG. 7A.

Referring to FIGS. 7A–7C, by pre-selecting the three columns ahead of time, the column processing circuitry only has to drive the multiplexing buses 214(1)–214(4) and 216(1)–216(4) at one quarter the actual pixel read rate (one-fourth the bandwidth). Only the demultiplexing in is done at the normal bandwidth. Thus, the column processing circuit, such as the active column sensor technology described in FIGS. 2–4, can be made smaller and requires less power than it would otherwise have to be. Also, since only one out of every four columns 206 of the pixel array 204 is coupled to each multiplexing bus in this example, each of the multiplexing buses 214(1)–214(4) and 216(1)–216(4) has only one-fourth of the capacitance, because there are only one fourth of the switches or transmission gates to drive. Further, with the present invention the column selection sequence remains conventional, without the need for post processing reconstruction of the original image as is required of multi-port imagers, such as the one shown in FIG. 6.

Another useful approach to the column parallel nature of the imager 202(1) with the bus system 200(1) in accordance with the present invention is the ability to select multiple columns at once to average the video signal. This is possible because the column amplifiers in the processing circuitry for the pixel array 204 are identical in every detail and when more than one is selected at once, the outputs from each amplifier try to drive each other and the result is that the two or more signals are averaged. This allows for higher speed of operation and it also gives a new method of binning or interpolating pixels. Binning is a term used to combine two or more pixel signals together. The higher speed of operation is due to two or more amplifiers driving the same video bus and as a result there is up to two times (or more) the ability to drive the same amount of capacitance. The binning is a result of combining two or more signals at the same time on the same bus 214 or 216. The control circuit 230(1) in the output multiplexor 226(1) can be configured and controlled with signals to couple two pairs of multiplexing buses: 214(1), 216(1); 214(2), 216(2); 214(3), 216(3); and 214(4), 216(4) to the video processing circuit 236 at one time for binning.

This multi-resolution ability of the bus system 200(1) can also be used to effectively increase the resolution through interpolation, not just decrease the resolution through binning as shown in FIGS. 8A and 8B. The imager 202(2) with the bus system 200(2) in FIGS. 8A and 8B operates in the same manner as the imager 202(1) with the bus system 200(1) in FIGS. 7A–7C, except that with the control circuit 230(2) in FIGS. 8A and 8B column interpolation is possible. In this embodiment, the increase of resolution is through the use of selectively binning adjacent signals in between reading individual signals with the control circuit 230(2). In this manner, the time sequence would be select the multiplexing buses 214(1) and 216(1) coupled to column 206(1) for coupling via closing switches 228(1) and 228(2) to the video processing circuit 236 and read the signal. Next in sequence leave column 206(1) selected and also select the multiplexing buses 214(2) and 216(2) coupled to column 206(2) via closing switches 228(3) and 228(4) for coupling to the video processing circuit 236. Read the combined (binned or averaged) signal and deselect column 206(1) by opening switches 228(1) and 228(2) to disconnect the multiplexing buses 214(1) and 216(1) coupled to column 206(1) from the video processing circuit 236 and only read the signal from the multiplexing buses 214(2) and 216(2) coupled to column 206(2). In this manner for every two adjacent signals read, a third interpolated signal can be read effectively increasing the resolution through interpolation. By way of example, an imager with a pixel array having 640 columns would have the effective resolution of 1279 pixels through interpolation or an imager with a pixel array having 480 rows would have an interpolated resolution of 969 rows. In either case, for binning or interpolation the column or row averaging is done by the output multiplexor.

Figure 9:
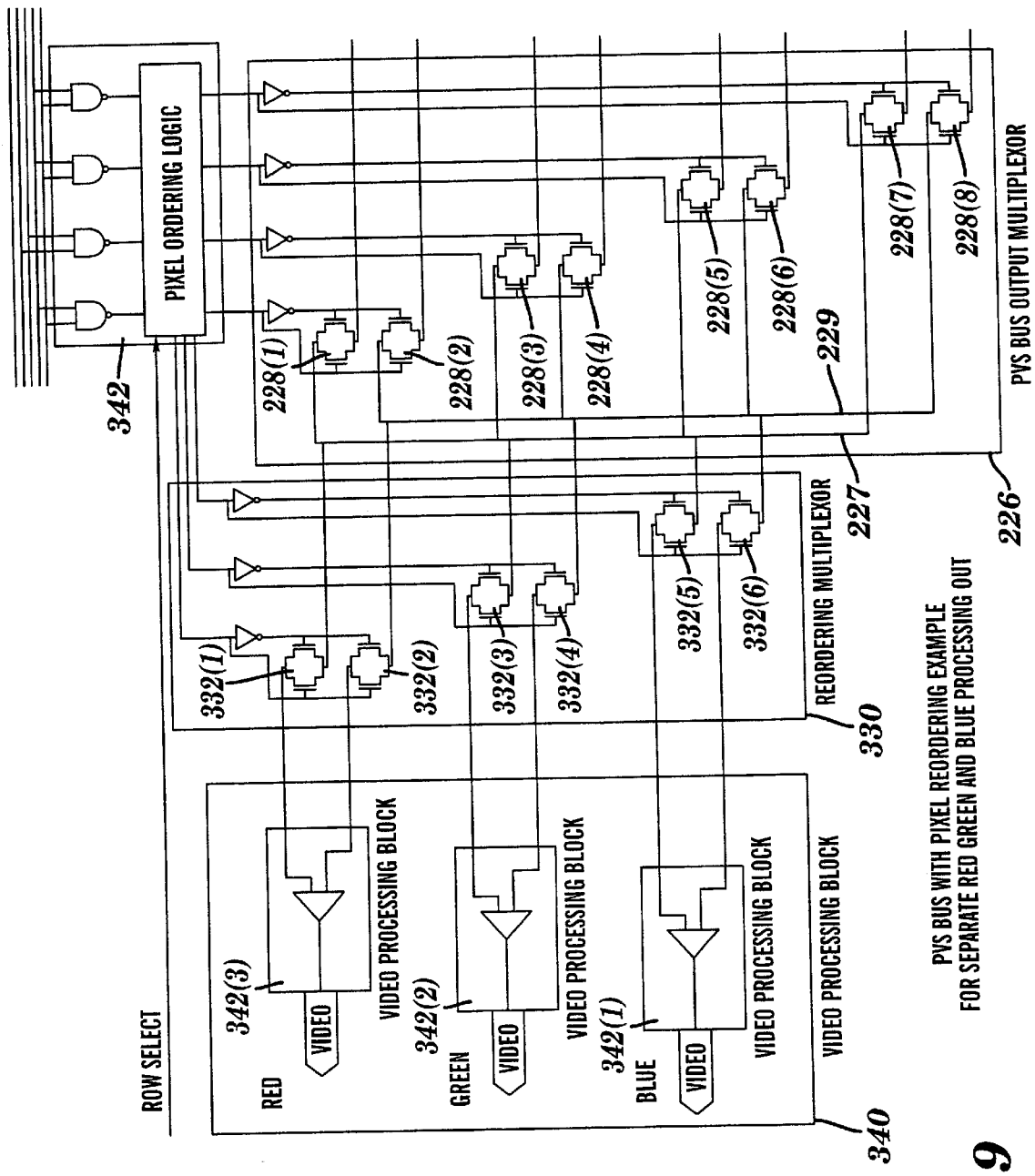
FIG. 9 is a block diagram of a bus system with another bus output multiplexor, control circuit, and video processing block in accordance with another embodiment of the present invention.

Referring to FIG. 9, a bus system 329 with another output multiplexor, control circuit, and video processing block in accordance with another embodiment of the present invention. This bus system 200(3) in FIG. 9 is the same as either the bus system 200(1) shown in FIGS. 7A–7C or the bus system 200(2) shown in FIGS. 8A and 8B, except that this bus system 200(3) also has a reordering multiplexor circuit 330. The reordering circuit 330, is coupled to the output multiplexor circuit 226 of FIG. 9, and is identical in function to the output multiplexer circuit of FIG. 8A. One possible implementation of the reordering circuit 330 is shown in more detail in FIG. 9. More specifcially, in this particular embodiment the reordering circuit 330 is made up of switches implemented as illustrated using transmission gates 332(1–6). The signals provided by the output multiplexer on nodes 226 and 227 can be controlled to be switched to one or more of the video processing block circuits 343(1–3) by the pixel ordering logic device 342. The details of the ordering logic device 342 are not shown here, but would be obvious to one of ordinary skill in the art. The particular implementation of ordering logic device 342 would depend on the specific application and the desired reordering of signals. The function of the control logic provided by the ordering logic device 342 in combination with the reordering multiplexor circuit 330 is to redirect a signal to one or more locations. As signals on nodes 227 and 229 of FIG. 9 can be redirected to one or more of the video amplifiers 342(1–3) of the video processing block 340.

Differential signals are shown on FIGS. 7A, 7B, 7C, 8A, 8B, and 9 which can be described as a signal and a reference signal that are utilized for noise immunity. A single ended configuration or multiple input, output and reording buses could be utilized for an application as well.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A bus system for transferring signals from a plurality of signal streams to an output, the bus system comprising:

a plurality of signal buses; and a control system that couples the signals from two or more of the plurality of signal streams onto two or more one of the plurality of signal buses and allowing the signals to substantially charge each of the two or more of the plurality of signal buses before coupling the signals to the output, wherein the control system provides binning by coupling the signals from two or more adjacent signals buses in the plurality of signal buses to the output at substantially the same time to average the signals on these signal buses together.

2. A method for transferring signals comprising:

coupling signals on to two or more of a plurality of signal buses;

allowing the signals to substantially charge each of the two or more of the plurality of signal buses before coupling the signals to an output; and binning by coupling the signals from two or more adjacent signals buses in the plurality of signal buses to the output at substantially the same time to average the signals on these signal buses together.

3. A bus system comprising:

a plurality of signal buses; and a control system that couples the signals from two or more of a plurality of signal streams onto two or more one of the plurality of signal buses and allows the signals to substantially charge each of the two or more of the plurality of signal buses before coupling the signals to an output, wherein the control system provides interpolation by coupling the two or more of the signals from the plurality of signal buses to the output separately and between coupling the two or more of the signals from the plurality of signal buses to the output separately, coupling each of the signals from adjacent pairs of the plurality of signal streams to the output at substantially the same time to obtain an interpolated signal.

4. The bus system as set forth in claim 1 wherein one of the plurality of signal buses is coupled to each of the plurality of signal streams.

5. The bus system as set forth in claim 1 wherein a pair of the plurality of signal buses are coupled to each of the plurality of signal streams for differential processing.

6. The bus system as set forth in claim 1 wherein the control system comprises:

a decoder;

a first control circuit coupled to the decoder; and a plurality of first switches coupled to the first control circuit, each of the plurality of first switches also being coupled between one of the plurality of signal streams and one of the plurality of signal buses.

7. The bus system as set forth in claim 6 wherein the decoder is a sequential decoder.

8. The bus system as set forth in claim 6 wherein the decoder is a random decoder.

9. The bus system as set forth in claim 6 wherein the control system further comprises:

an address counter coupled to the decoder;
a second control circuit coupled to the address counter; and
a plurality of second switches coupled to the second control circuit, each of the plurality of second switches also being coupled between one of the plurality of signal buses and the output.

10. An imager comprising:
a plurality of streams of signals from a source;
a plurality of signal buses in parallel;
an output; and
a control system that couples the signals from two or more of the plurality of signal streams onto two or more of the plurality of signal buses and allows the signals to substantially charge each of the two or more of the plurality of signal buses before coupling the signals to the output;
wherein the control system provides binning by coupling the signals from two or more adjacent signals buses in the plurality of signal buses to the output at substantially the same time to average the signals on these signal buses together.

11. The method as set forth in claim 2 further comprising binning by coupling the signals from two or more adjacent signals buses in the plurality of signal buses to the output at substantially the same time to average the signals on these signal buses together.

12. An imager comprising:
a plurality of signal buses; and
a control system that couples the signals from two or more of a plurality of signal streams onto two or more one of the plurality of signal buses and allows the signals to substantially charge each of the two or more of the plurality of signal buses before coupling the signals to an output;
wherein the control system provides interpolation by coupling the two or more of the signals from the plurality of signal buses to the output separately and between coupling the two or more of the signals from the plurality of signal buses to the output separately, coupling each of the signals from adjacent pairs of the plurality of signal streams to the output at substantially the same time to obtain an interpolated signal.

13. The imager as set forth in claim 10 wherein one of the plurality of signal buses is coupled to each of the plurality of signal streams.

14. The imager as set forth in claim 10 wherein a pair of the plurality of signal buses are coupled to each of the plurality of signal streams for differential processing.

15. The imager as set forth in claim 10 wherein the control system comprises:
a decoder;
a first control circuit coupled to the decoder; and
a plurality of first switches coupled to the first control circuit, each of the plurality of first switches also being coupled between one of the plurality of signal streams and one of the plurality of signal buses.

16. The imager as set forth in claim 15 wherein the decoder is a sequential decoder.

17. The imager as set forth in claim 15 wherein the decoder is a random decoder.

18. The imager as set forth in claim 15 wherein the control system further comprises:
an address counter coupled to the decoder;
a second control circuit coupled to the address counter; and a plurality of second switches coupled to the second control circuit, each of the plurality of second switches also being coupled between one of the plurality of signal buses and the output.

19. The imager as set forth in claim 10 further comprising a video processing circuit coupled to the output.

20. The imager as set forth in claim 19 wherein the video processing circuit provides differential processing.

21. A bus system for transferring signals from a plurality of signal streams to an output, the bus system comprising:
a plurality of signal buses coupled to the plurality signal streams;
a plurality of first switches, each of the plurality of first switches coupled between one of the plurality of signal streams and one of the plurality of signal buses;
a plurality of second switches, each of the plurality of second switches coupled between one of the plurality of signal buses and the output; and
a control system coupled to the first and second switches, the control system closing two or more of the plurality of first switches to couple signals from the two or more of the plurality of signal streams to two or more of the plurality of signal buses and allowing the signals to substantially charge each of the two or more of the plurality of signal buses before closing one or more of the plurality of second switches to couple the signals to the output;
wherein the control system provides binning by coupling the signals from two or more adjacent signals buses in the plurality of signal buses to the output at substantially the same time to average the signals on these signal buses together.

22. A method for transferring signals comprising:
coupling signals on to two or more of a plurality of signal buses;
allowing the signals to substantially charge each of the two or more of the plurality of signal buses before coupling the signals to an output; and
interpolating by coupling the two or more of the signals from the plurality of signal buses to the output separately and between coupling the two or more of the signals from the plurality of signal buses to the output separately, coupling each of the signals from adjacent pairs of the plurality of signal streams to the output at substantially the same time to obtain an interpolated signal.

23. A bus system for transferring signals from a plurality of signal streams to an output, the bus system comprising:
a plurality of signal buses coupled to the plurality signal streams;
a plurality of first switches, each of the plurality of first switches coupled between one of the plurality of signal streams and one of the plurality of signal buses;
a plurality of second switches, each of the plurality of second switches coupled between one of the plurality of signal buses and the output; and
a control system coupled to the first and second switches, the control system closing two or more of the plurality of first switches to couple signals from the two or more of the plurality of signal streams to two or more of the plurality of signal buses and allowing the signals to substantially charge each of the two or more of the plurality of signal buses before closing one or more of the plurality of second switches to couple the signals to the output;

wherein the control system provides interpolation by coupling the two or more of the signals from the plurality of signal buses to the output separately and between coupling the two or more of the signals from the plurality of signal buses to the output separately coupling each of the signals from adjacent pairs of the plurality of signal streams to the output at substantially the same time to obtain an interpolated signal.

24. The bus system as set forth in claim 21 wherein one of the plurality of signal buses is coupled to each of the plurality of signal streams.

25. The bus system as set forth in claim 21 wherein a pair of the plurality of signal buses are coupled to each of the plurality of signal streams for differential processing.

26. The bus system as set forth in claim 21 wherein the control system comprises:
   a decoder;
   a first control circuit coupled to the decoder and the plurality of first switches
   an address counter coupled to the decoder; and
   a second control circuit coupled to the address counter and to the plurality of second switches.

27. The bus system as set forth in claim 26 wherein the decoder is a sequential decoder.

28. The bus system as set forth in claim 26 wherein the decoder is a random access decoder.

* * * * *

(12) INTER PARTES REEXAMINATION CERTIFICATE (0362nd)
United States Patent
Zarnowski et al.

(10) Number: US 6,633,029 C1
(45) Certificate Issued: Apr. 3, 2012

(54) VIDEO BUS FOR HIGH SPEED MULTI-RESOLUTION IMAGERS AND METHOD THEREOF

(75) Inventors: Jeffrey Zarnowski, McGraw, NY (US); Matthew Pace, Cortland, NY (US); Thomas Vogelsong, Jamesville, NY (US); Michael Joyner, North Syracuse, NY (US)

(73) Assignee: Credit Suisse, New York, NY (US)

Reexamination Request:
No. 95/000,519, Nov. 24, 2009

Reexamination Certificate for:
Patent No.: 6,633,029
Issued: Oct. 14, 2003
Appl. No.: 09/768,124
Filed: Jan. 23, 2001

Related U.S. Application Data

(63) Continuation-in-part of application No. 09/490,374, filed on Jan. 24, 2000, now Pat. No. 6,590,198, which is a continuation-in-part of application No. 09/039,835, filed on Mar. 16, 1998, now Pat. No. 6,084,229.

(51) Int. Cl.
*H04N 3/15* (2006.01)

(52) U.S. Cl. .................................. 250/214 R; 250/208.1; 348/E3.018; 348/E3.02; 348/E3.021; 348/E3.029

(58) Field of Classification Search ................... 250/214
See application file for complete search history.

(56) References Cited

To view the complete listing of prior art documents cited during the proceeding for Reexamination Control Number 95/000,519, please refer to the USPTO's public Patent Application Information Retrieval (PAIR) system under the Display References tab.

*Primary Examiner* — Fred Ferris

(57) ABSTRACT

A bus system and an imager for transferring signals from a plurality of signal streams to an output includes a plurality of signal buses in parallel and a control system. The control system multiplexes the signals from two or more of the plurality of signal streams onto two or more of the plurality of signal buses and allows the signals to substantially charge each of the two or more of the plurality of signal buses before demultiplexing the signals to the output. A method for transferring signals includes multiplexing signals on to two or more of a plurality of signal buses and allowing the signals to substantially charge each of two or more of the plurality of signal buses before demultiplexing the signals to an output.

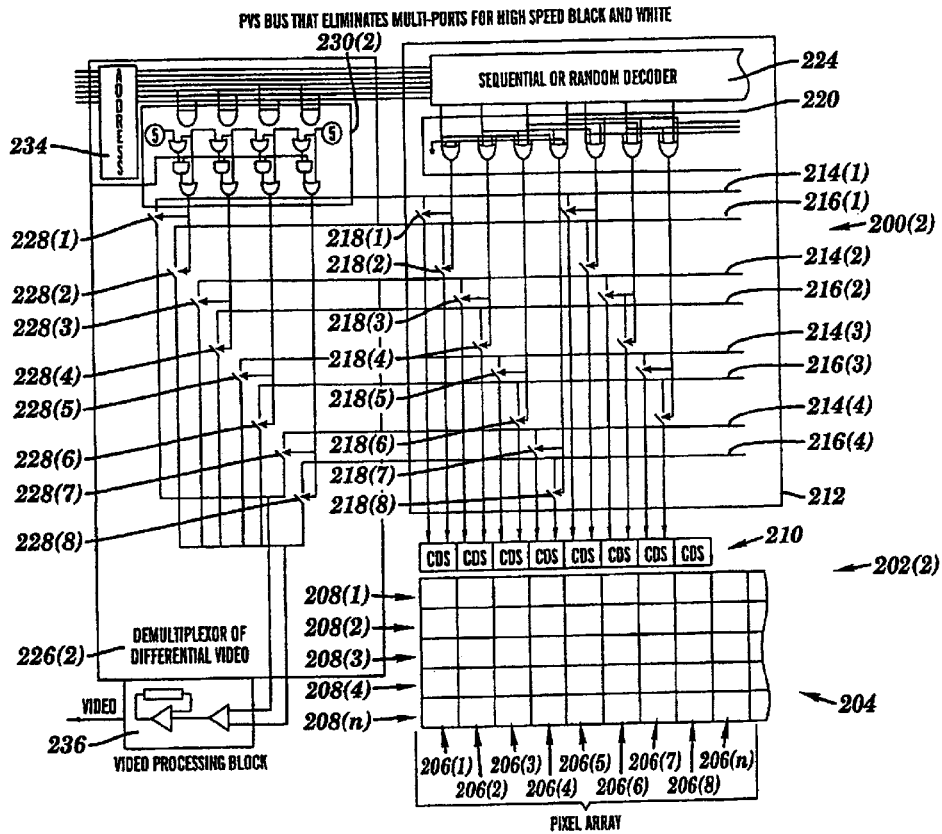

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 2, 10, 15 and 19 are cancelled.
Claims 1, 3-9, 11-14, 16-18 and 20-28 were not reexamined.

\* \* \* \* \*